(12) United States Patent
Kakuchi et al.

(10) Patent No.: US 10,323,101 B2
(45) Date of Patent: Jun. 18, 2019

(54) METHOD FOR PRODUCING POLYSACCHARIDE DERIVATIVE AND LIGNIN DERIVATIVE

(71) Applicants: NATIONAL UNIVERSITY CORPORATION KANAZAWA UNIVERSITY, Kanazawa-shi, Ishikawa (JP); Kanazawa Institute of Technology, Nonoichi-shi, Ishikawa (JP)

(72) Inventors: Ryohei Kakuchi, Kanazawa (JP); Kazuaki Ninomiya, Kanazawa (JP); Yoshiki Shibata, Kanazawa (JP); Kiyoshi Uzawa, Nonoichi (JP); Tomoki Ogoshi, Kanazawa (JP); Katsuhiro Maeda, Kanazawa (JP); Tomoyuki Ikai, Kanazawa (JP); Kenji Takahashi, Kanazawa (JP)

(73) Assignees: NATIONAL UNIVERSITY CORPORATION KANAZAWA UNIVERSITY, Kanazawa-Shi, Ishikawa (JP); KANAZAWA INSTITUTE OF TECHNOLOGY, Nonoichi-Shi, Ishikawa (JP)

( * ) Notice: Subject to any disclaimer, the term of this patent is extended or adjusted under 35 U.S.C. 154(b) by 0 days.

(21) Appl. No.: 15/521,200

(22) PCT Filed: Oct. 23, 2015

(86) PCT No.: PCT/JP2015/080036
§ 371 (c)(1),
(2) Date: Apr. 21, 2017

(87) PCT Pub. No.: WO2016/068053
PCT Pub. Date: May 6, 2016

(65) Prior Publication Data
US 2018/0022832 A1    Jan. 25, 2018

(30) Foreign Application Priority Data
Oct. 27, 2014   (JP) ............................... 2014-218237

(51) Int. Cl.
| | |
|---|---|
| *C07G 1/00* | (2011.01) |
| *C08B 3/00* | (2006.01) |
| *C08B 3/06* | (2006.01) |
| *C08B 3/18* | (2006.01) |
| *C08B 11/00* | (2006.01) |
| *C08B 11/02* | (2006.01) |

(52) U.S. Cl.
CPC ............. *C08B 3/06* (2013.01); *C07G 1/00* (2013.01); *C08B 3/00* (2013.01); *C08B 3/18* (2013.01); *C08B 11/00* (2013.01); *C08B 11/02* (2013.01); *Y02P 20/542* (2015.11)

(58) Field of Classification Search
CPC ....................................................... C08B 3/06
See application file for complete search history.

(56) References Cited

U.S. PATENT DOCUMENTS

| | | | | |
|---|---|---|---|---|
| 7,919,631 | B2 * | 4/2011 | Buchanan | C07D 233/54 548/335.1 |
| 8,148,518 | B2 * | 4/2012 | Buchanan | C07D 233/54 536/124 |
| 8,153,782 | B2 | 4/2012 | Buchanan et al. | |
| 9,834,516 | B2 * | 12/2017 | Buchanan | C07D 233/54 |
| 2007/0073051 | A1 * | 3/2007 | Myllymaki | C08B 31/04 536/110 |
| 2008/0188636 | A1 * | 8/2008 | Argyropoulos | C08H 8/00 527/300 |
| 2008/0194807 | A1 * | 8/2008 | Buchanan | C07D 233/54 536/63 |
| 2009/0203900 | A1 * | 8/2009 | Buchanan | C08B 1/003 536/58 |

(Continued)

FOREIGN PATENT DOCUMENTS

| | | |
|---|---|---|
| CN | 102558572 A | 7/2012 |
| JP | 2008-266625 A | 11/2008 |

(Continued)

OTHER PUBLICATIONS

Chiarotto et al. (Eur. J. Org. Chem. 2013, 326-331) (Year: 2013).*
Shogren et al. (Carbohydrate Polymers 81, 2010, 149-151) (Year: 2010).*
Mayumi et al. (Journal of Applied Polymer Science, vol. 102, 4358-4364 (2006)) (Year: 2006).*
Luan et al. (Cellulose (2013) 20:327-337)) (Year: 2013).*
A. Schenzel et al., "Catalytic transesterification of cellulose in ionic liquids: sustainable access to cellulose esters", Green Chemistry, 2014, vol. 16, pp. 3266-3271.
S. Koehler et al., "Interactions of ionic liquids with polysaccharides 1. unexpected acetylation of cellulose with 1-ethyl-3-methylimidazolium acetate", Macromolecular Rapid Communications, 2007, vol. 28, No. 24, pp. 2311-2317.

(Continued)

*Primary Examiner* — Liam J Heincer
(74) *Attorney, Agent, or Firm* — Lucas & Mercanti, LLP

(57) ABSTRACT

An object is to provide a method for producing a polysaccharide derivative without using a catalyst, a cocatalyst, or an active compound by esterification, etherification, or the like, from a polysaccharide such as cellulose as a source material, while maintaining a high molecular weight. Another object is to provide a method for producing a cellulose derivative in a separated condition directly from biomass containing lignocellulose. A method for producing a polysaccharide derivative of the present invention is characterized in that a reaction is carried out in a mixture comprising: a source material comprising a polysaccharide; an ionic liquid for which the pKa of a conjugate acid of an anion in DMSO is 12 to 19 and which is capable of producing a carbene; and a chain or cyclic ester compound or an epoxy compound. Preferably as a source material containing a polysaccharide, a biomass source material containing lignocellulose is used.

14 Claims, 19 Drawing Sheets

(56) References Cited

U.S. PATENT DOCUMENTS

| | | | | |
|---|---|---|---|---|
| 2009/0221813 | A1* | 9/2009 | Moellmann | C08B 1/003 536/85 |
| 2011/0213138 | A1* | 9/2011 | Buchanan | C08B 1/003 536/65 |
| 2012/0088909 | A1* | 4/2012 | Lehmann | C08B 3/02 536/58 |
| 2012/0101269 | A1* | 4/2012 | Buchanan | C07D 233/54 536/65 |
| 2014/0024825 | A1* | 1/2014 | Kano | C08B 3/16 536/68 |
| 2014/0326422 | A1* | 11/2014 | Fallon | D21C 3/20 162/16 |
| 2016/0130408 | A1* | 5/2016 | Jansen | C08H 6/00 514/777 |

FOREIGN PATENT DOCUMENTS

| | | |
|---|---|---|
| JP | 2010-518166 A | 5/2010 |
| JP | 2010-518244 A | 5/2010 |
| JP | 2010-518245 A | 5/2010 |
| JP | 2010-5518166 A | 5/2010 |
| JP | 2011-530643 A | 12/2011 |
| JP | 2012-519740 A | 8/2012 |
| JP | 2012-207136 A | 10/2012 |
| WO | 2009/102307 A1 | 8/2009 |
| WO | 2012/133003 A1 | 10/2012 |

OTHER PUBLICATIONS

C. Chen et al., "Per-O-acetylation of cellulose in dimethyl sulfoxide with catalyzed transesterification", Journal of Agricultural and Food Chemistry, 2014, vol. 62, No. 15, pp. 3446-3452.

L. Pei et al., "Synthesis and antibacterial activity of alkylated chitosan under basic ionic liquid conditions", Journal of Applied Polymer Science, 2014, vol. 131, No. 7, pp. 40052(1)-40052(7).

"Cellulose no Jiten (Encyclopedia of Cellulose)," Asakura Publishing Co., Ltd., Nov. 10, 2000, pp. 410-413.

PCT International Search Report issued in connection with PCT international application No. PCT/JP2015/080036, filed Oct. 23, 2015, dated Jan. 26, 2016, and its English translation (10 pages).

* cited by examiner

METHOD FOR PRODUCING POLYSACCHARIDE DERIVATIVE AND LIGNIN DERIVATIVE

CROSS-REFERENCE TO RELATED APPLICATIONS

This application is a 371 of PCT/JP2015/080036, filed Oct. 23, 2015, which claims the benefit of Japanese Patent Application No. 2014-218237, filed Oct. 27, 2014.

TECHNICAL FIELD

The present invention relates to a method for producing a polysaccharide derivative and a lignin derivative.

BACKGROUND ART

Stable supply of various chemical products using petroleum as a source material has been getting difficult recently due to worldwide depletion of petroleum resources and price hike derived therefrom. In 1980s the international price of naphtha was approximately 20 dollars per barrel, however in 2010s it is approaching 100 dollars per barrel. As the result, a price increase and profitability deterioration of plastics using petroleum as a source material have come to occur actually. Especially, in Japan, which is lacking in stably available natural resources, an influence of petroleum price hike is serious, and a proposal from a research directed to a structural innovation of chemical industries is required urgently.

Under such circumstances, there has been a great expectation in effective utilization of biomass which resources of biological origin. However, for effective utilization of lignocellulose (biomass), which is a mixture of lignin, hemicellulose, and cellulose, a separation step for the respective ingredients is currently indispensable. Ordinarily, either of a polysaccharide (cellulose and hemicellulose) or a lignin is selectively degraded, and one ingredient in the biomass is recovered as a low-molecular-weight compound and the other ingredient in the biomass is recovered as a polymer. In general, after the above purification step, the intermediate products are converted in an organic chemical manner or a biochemical manner to a useful chemical substance. For example, in a case where cellulose acetate is produced using biomass as a source material, cellulose acetate with a desired acetylation degree is produced from wood chips as a source material by producing a high purity wood pulp or cotton linter (main ingredient is cellulose) through a digestion step, a cleaning and washing step, an enzymatic delignification step, a bleaching step, etc.; activating the wood pulp or cotton linter by a pretreatment, performing a esterification reaction in an acetylation step by adding acetic anhydride, and acetic acid, as well as sulfuric acid as a catalyst to the cellulose, and implementing an aging step. However, the above production process is economically and thermally disadvantageous, and therefore not yet able to replace an existing petrochemical process. Further, the degree of polymerization of cellulose is decreased during production of wood pulp, and cellulose acetate obtained therefrom has only a low degree of polymerization, and as the result its mechanical property becomes lower and handling becomes difficult when the same is processed to a fiber or a film, etc. and moreover there arises a drawback that the color tone of a processed product becomes yellowish due to thermal degradation, etc. during processing.

Meanwhile, lignin is a polymer composed of an aromatic compound and one of the main ingredients composing a plant cell wall together with polysaccharides (cellulose and hemicellulose). Lignin is obtained as a byproduct of a paper pulp production process or a bio-ethanol production process, however it is only utilized mainly as a fuel, and its industrial utilization has not yet advanced well in the present circumstances.

Recently, utilization of an ionic liquid has been proposed for a treatment of biomass. However, in many of preceding studies reported so far, an ionic liquid is used in a pretreatment step for biomass for the purpose of partial relaxation of a biomass structure. Therefore, a subsequent degradation reaction such as degradation of a polysaccharide ingredient by an enzymatic saccharification reaction is indispensable. Consequently, this technology is heretofore economically disadvantageous compared to existing technologies. A technology to easily synthesize and separate a polysaccharide derivative such as a polysaccharide ester and a lignin derivative such as a lignin ester directly from biomass is believed to be thermodynamically and economically advantageous, however it has been hardly achievable.

Meanwhile, some technologies for derivatizing cellulose by utilizing an ionic liquid have been known. Since an ionic liquid has an extremely low volatility, and therefore is free from risks of contamination or ignition by volatilization, and further it has a high dissolving power with respect to cellulose, research and development works thereof as a solvent for processing cellulose have been in progress. For example, Non Patent Literature 1 discloses a method by which cellulose is esterified using an ionic liquid of 1-butyl-3-methylimidazolium chloride (BMIMCl) as a solvent, and 1,5,7-triazabicyclo[4.4.0]dec-5-ene (TBD) as a catalyst.

Further, Patent Literature 1 discloses a method by which cellulose is swelled with acetic acid, acetic anhydride and sulfuric acid are added thereto to react so as to produce cellulose acetate (cellulose derivative), and in a mixture containing the cellulose derivative, an ionic liquid such as 1-butyl-3-methylimidazolium chloride, and an esterification agent selected from the group consisting of a carboxylic anhydride, a carboxylic halide, and a carboxylic acid, the cellulose derivative is esterified to produce an esterified product of cellulose derivative.

The technology of Non Patent Literature 1 as described above is disadvantageous, because a catalyst is necessary separately in addition to an ionic liquid. Further, since the technology of Patent Literature 1 as described above uses sulfuric acid as a catalyst, there remains a drawback in terms of a waste treatment requirement, and also a problem of decrease in a molecular weight due to the use of a strong acid. Furthermore, since a carboxylic anhydride or the like is used as an esterification agent according to Patent Literature 1 and a carboxylic anhydride is corrosive, the technology is disadvantageous from the viewpoint of process.

CITATION LIST

Non Patent Literature

Non Patent Literature 1: A. Schenzel, et al., Green Chem., 2014, 16, 3266-3271.

Patent Literature

Patent Literature 1: International Publication No. WO2012/133003 (Claim 1, Paragraph 0075, and Paragraph 0085)

SUMMARY OF INVENTION

Technical Problem

In view of existing situation as described above, an object of the present invention is to provide a method for producing a polysaccharide derivative, and a lignin derivative without using a catalyst, a cocatalyst, or an active compound by esterification, etherification, or the like from a polysaccharide such as cellulose, or a lignin as a source material, while maintaining a high molecular weight.

Another object is to provide a method for producing a cellulose derivative in a separated condition directly from biomass containing lignocellulose. Further, another object is to provide a method for producing at the same time a lignin derivative in a clearly fractionated condition.

Solution to Problem

To achieve the above objects, the inventors studied diligently to find that a specific ionic liquid dissolves well biomass containing not only a polysaccharide such as cellulose, or a lignin, but also lignocellulose, and also that a carbene, which is one of the most active organocatalysts, is produced spontaneously from the ionic liquid, and the carbene can also function as a catalyst for derivatization of a polysaccharide or a lignin, thereby completing the invention. Namely, the essentials of the present invention are as follows.

(1) A method for producing a polysaccharide derivative, wherein a reaction is carried out in a mixture comprising: a source material comprising a polysaccharide; an ionic liquid for which the pKa of a conjugate acid of an anion in DMSO is 12 to 19 and which is capable of producing a carbene; and a chain or cyclic ester compound or an epoxy compound.
(2) The method for producing a polysaccharide derivative according to (1) above, wherein the polysaccharide is cellulose.
(3) The method for producing a polysaccharide derivative according to (1) above, wherein the source material comprising a polysaccharide is a biomass source material comprising cellulose as lignocellulose, and a cellulose derivative is produced in a condition separated from a lignin.
(4) The method for producing a polysaccharide derivative according to (3) above, wherein the cellulose derivative is produced, and also a lignin derivative is produced.
(5) The method for producing a polysaccharide derivative according to any one of (1) to (4) above, wherein the ionic liquid is included in the mixture as a cosolvent system with an organic solvent.
(6) The method for producing a polysaccharide derivative according to any one of (1) to (5) above, wherein the weight of the ionic liquid is two times or more of the weight of the polysaccharide.
(7) The method for producing a polysaccharide derivative according to any one of (1) to (6) above, wherein 2 or more chain or cyclic ester compounds are included in the mixture.
(8) The method for producing a polysaccharide derivative according to any one of (1) to (7) above, wherein the chain ester compound is a carboxylate ester selected from the group consisting of isopropenyl carboxylate, vinyl carboxylate, and methyl carboxylate.
(9) The method for producing a polysaccharide derivative according to any one of (1) to (8) above, wherein a cation of the ionic liquid is an imidazolium cation.
(10) The method for producing a polysaccharide derivative according to any one of (1) to (9) above, wherein an anion of the ionic liquid is a carboxylate anion.
(11) A method for producing a lignin derivative, wherein a reaction is carried out in a mixture comprising: a source material comprising a lignin; an ionic liquid for which the pKa of a conjugate acid of an anion in DMSO is 12 to 19 and which is capable of producing a carbene; and a chain or cyclic ester compound or an epoxy compound.
(12) The method for producing a lignin derivative according to (11) above, wherein 2 or more chain or cyclic ester compounds are included in the mixture.
(13) The method for producing a lignin derivative according to (11) or (12) above, wherein the chain ester compound is a carboxylate ester selected from the group consisting of isopropenyl carboxylate, vinyl carboxylate, and methyl carboxylate.
(14) The method for producing a lignin derivative according to any one of (11) to (13) above, wherein a cation of the ionic liquid is an imidazolium cation.
(15) The method for producing a lignin derivative according to any one of (11) to (14) above, wherein an anion of the ionic liquid is a carboxylate anion.

The present specification claims the priority of the present application based on Japanese Patent Application No. 2014-218237, which disclosure is incorporated herein.

Advantageous Effects of Invention

According to the present invention, a polysaccharide derivative, such as an ester compound, or an ether compound, or a lignin derivative may be obtained efficiently from a polysaccharide such as cellulose, or a lignin as a source material without using specially a catalyst. Further, from biomass containing lignocellulose as a source material, a cellulose derivative and a lignin derivative may be obtained directly without going through a separation step for each ingredient, while maintaining a high degree of polymerization, and therefore the production cost may be curbed remarkably.

DESCRIPTION OF EMBODIMENTS

Figure 1:
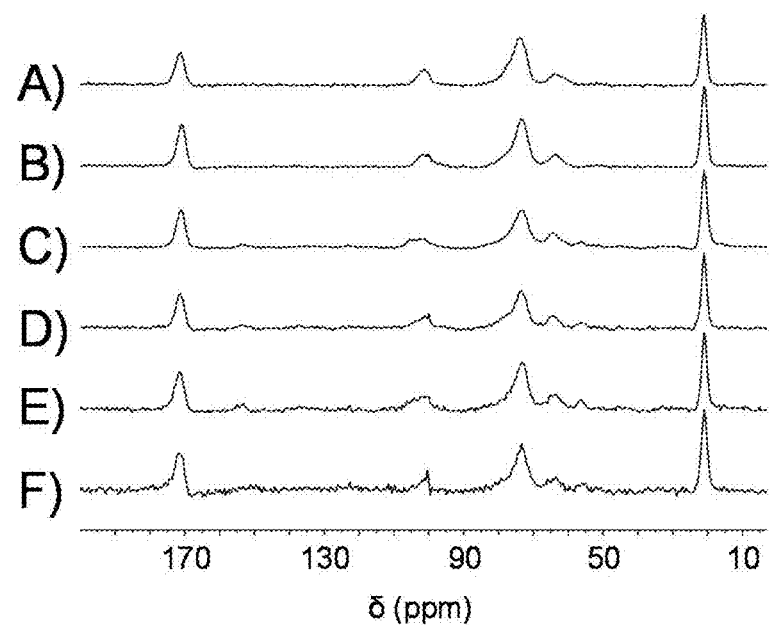
FIG. 1 is a figure showing solid $^{13}$C NMR spectra of (A) a commercially available cellulose acetate, (B) a cellulose acetate synthesized in Example 5, (C) a polysaccharide derivative obtained from bagasse according to Example 1, (D) a polysaccharide derivative obtained from kenaf according to Example 2, (E) a polysaccharide derivative obtained from eucalyptus according to Example 3, and (F) a polysaccharide derivative obtained from Japanese cedar according to Example 4.

The present invention will be described in detail below.

Firstly, a method for producing a polysaccharide derivative will be described. A method for producing a polysaccharide derivative according to the present invention is characterized in that a reaction is carried out in a mixture containing a source material containing a polysaccharide, a specific ionic liquid, and a chain or cyclic ester compound or an epoxy compound.

As a polysaccharide various polysaccharides are applicable, and examples thereof include cellulose, starch, agarose, pectin, and chitin. The structure of the polysaccharides may be partly substituted. For example, a cellulose derivative, in which part of hydroxy groups of cellulose may be esterified, may be used as a source material.

Further, in the present invention, a biomass source material containing cellulose as lignocellulose may be used as a source material containing a polysaccharide. A cellulose derivative may be obtained in a condition separated from lignin from such a biomass source material directly without going through a step for separating and extracting cellulose, while maintaining a high molecular weight. Consequently, the production cost of a cellulose derivative may be curbed, and a produced cellulose derivative may be, for example, in the case of cellulose ester, used in a fiber, a film, a plastic, a cigarette filter, etc., and in the case of cellulose ether, used as an additive in a food, a pharmaceutical, a cosmetic, a detergent. etc. Since a cellulose derivative may be occasionally obtained in a condition mixed with hemicellulose or a derivative thereof, it may be further purified to separate solely the cellulose derivative. Specific examples of such a biomass source material, which may be appropriately selected for use, include bagasse (sugarcane residue), kenaf, wood, such as Japanese cedar, and eucalyptus, and a ginkgo nut, as well as a mixture of 2 or more thereof. A biomass source material may be, if necessary, subjected to various pretreatments, such as cutting, and drying, before a reaction of the present invention.

An ionic liquid applicable according to the present invention has preferably an acid dissociation constant (pKa) of the conjugate acid of an anion in dimethyl sulfoxide (DMSO) of 12 to 19, and preferably 12.3 to 18.6, and is capable of producing a carbene. In this regard, the above pKa means a value at 25° C. Carbene is a divalent chemical species, in which there are only 6 valence electrons in the vicinity of a carbon, and functions as an active organocatalyst in a derivatization reaction of a polysaccharide according to the present invention. As a specific example, there is a heterocyclic carbene, which is derived from an imidazolium-base ionic liquid of 1-ethyl-3-methylimidazolium acetate (EmimAc), and has a structure as follows. The heterocyclic carbene is produced spontaneously by heating 1-ethyl-3-methylimidazolium acetate to approximately 80° C.

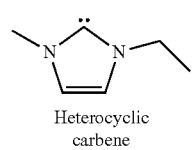

[Formula 1]

Heterocyclic carbene

Examples of an applicable ionic liquid include an imidazolium salt. Especially, an imidazolium salt (imidazolium-base ionic liquid) having a cation represented by the following Formula (1) as a cation of an ionic liquid is preferable, provided that it is not limited thereto.

[Formula 2]

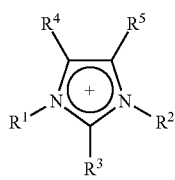

wherein, $R^1$ and $R^2$ each independently are an alkyl group, an alkenyl group, an alkoxyalkyl group, or a substituted or unsubstituted phenyl group, and $R^3$ to $R^5$ each independently are hydrogen, an alkenyl group, an alkoxyalkyl group, or a substituted or unsubstituted phenyl group.

Examples of the above alkyl group include a linear or branched alkyl group having 1 to 20 carbon atoms, such as a methyl group, an ethyl group, a n-propyl group, an isopropyl group, a butyl group, a hexyl group, and an octyl group. To the end of the alkyl groups, a sulfo group may be bonded. Meanwhile, examples of an alkenyl group include a linear or branched alkenyl group having 1 to 20 carbon atoms, such as a vinyl group, a 1-propenyl group, a 2-propenyl group, a 1-butenyl group, a 2-butenyl group, a 1-pentenyl group, a 2-pentenyl group, a 1-hexenyl group, a 2-hexenyl group, and a 1-octenyl group. Further, examples of an alkoxyalkyl group include a linear or branched alkoxyalkyl group having 2 to 20 carbon atoms, such as a methoxymethyl group, an ethoxymethyl group, a 1-methoxyethyl group, a 2-methoxyethyl group, a 1-ethoxyethyl group, and a 2-ethoxyethyl group. Further, examples of a substituted or unsubstituted phenyl group include a phenyl group, which may be substituted with 1 to 2 groups selected from a hydroxy group, a halogen atom, a lower alkoxy group, a lower alkenyl group, a (methylsulfonyl)oxy group, a substituted or unsubstituted lower alkyl group, a substituted or unsubstituted amino group, a substituted or unsubstituted phenyl group, a substituted or unsubstituted phenoxy group, and a substituted or unsubstituted pyridyl group.

An anion for an ionic liquid is applicable as long as its conjugate acid has a pKa in DMSO within the range of 12 to 19, and it can form an ionic liquid. Examples thereof include a carboxylate anion, such as a formate anion (HCOO$^-$), and an acetate anion (CH$_3$COO$^-$), various amino acid anions (such as a glutamic acid anion), a cyanide ion (CN$^-$), and a fluoride ion (F$^-$). Since a halogen anion, such as a chloride ion (Cl$^-$), an iodine ion (I$^-$), and a bromide ion (Br$^-$), except a fluoride ion, and an anion of a strong acid, such as a sulfate anion, and a phosphate anion, of which the conjugate acid exhibits a pKa in DMSO outside the range of 12 to 19, and which does not produce a carbene, they are not usable.

Examples of an ionic liquid that can be used favorably in the present invention include, but not limited to, the following compounds: 1-ethyl-3-methylimidazolium acetate, 1-butyl-3-methylimidazolium acetate, and 1-hexyl-3-methylimidazolium acetate.

The above ionic liquid serves as a solvent for a source material containing a polysaccharide, and at the same time produces a carbene by heating at 40 to 80° C. or irradiation with microwave. In this case the carbene functions as a catalyst, which progresses derivatization of a polysaccharide. As a specific example, a formula of a reaction of cellulose and isopropenyl acetate in an ionic liquid of 1-ethyl-3-methylimidazolium acetate (EmimAc) is presented below. As described above, a heterocyclic carbene produced from an ionic liquid functions as a catalyst, and cellulose acetate is produced by a transesterification reaction.

[Formula 3]

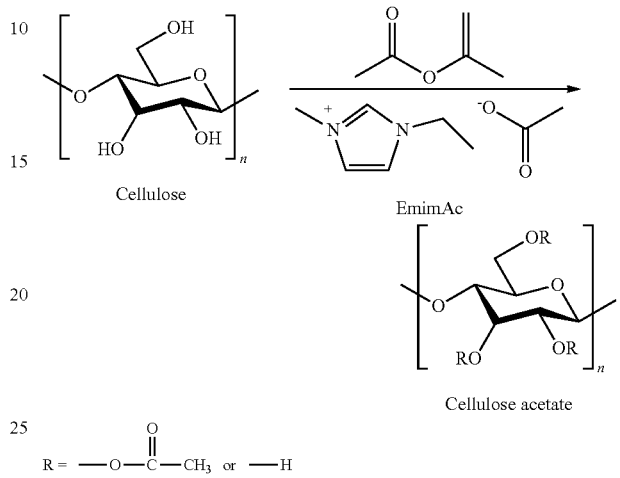

The concentration of a source material containing a polysaccharide in an ionic liquid as a solvent varies depending on the type or the molecular weight of a polysaccharide. The weight of an ionic liquid is preferably, but not limited to, two times or more of the weight of the polysaccharide, and especially the concentration of a source material containing a polysaccharide in an ionic liquid is preferably 3% by weight to 5% by weight.

An ionic liquid may be used as a cosolvent system with an organic solvent. Also in this case, the weight of an ionic liquid is preferably two times or more of the weight of the polysaccharide, and within the range of this condition the amount of an ionic liquid used may be reduced and an organic solvent may substitute for the balance, so that the production cost of a polysaccharide derivative can be curbed.

An organic solvent to be used as a cosolvent may be selected appropriately from various organic solvents considering its solubility, etc. with respect to a polysaccharide derivative to be produced, on condition that it does not react with an ionic liquid. Specific examples thereof include acetonitrile, tetrahydrofuran (THF), dimethyl formamide (DMF), dimethyl acetamide (DMAc), dimethyl sulfoxide (DMSO), 1,3-dioxolane, and 1,4-dioxane. Although chloroform cannot be applied in many cases, because it reacts with some ionic liquids such as 1-ethyl-3-methylimidazolium acetate (EmimAc), it is not excluded from the scope of the present invention. When cellulose butyrate is produced as a polysaccharide derivative, tetrahydrofuran (THF) is used preferably, and when cellulose acetate is produced, dimethyl sulfoxide (DMSO), 1,3-dioxolane, etc. are used preferably, without limiting thereto.

As a chain or cyclic ester compound or an epoxy compound to be reacted with a polysaccharide, a compound corresponding to a type of polysaccharide derivative to be produced may be appropriately selected and used. With a chain ester compound a transesterification reaction advances to yield a derivative, in which a hydroxy group of a polysaccharide is esterified. Meanwhile, by reacting a cyclic ester compound with a polysaccharide, a polyester may be obtained. Further, by reacting an epoxy compound with a polysaccharide, an ether compound such as cellulose ether may be obtained.

Examples of a chain ester compound include one or more compounds selected from an isopropenyl carboxylate, such as isopropenyl acetate; and a carboxylate ester, such as vinyl carboxylate, and methyl carboxylate. A carboxylate ester has been heretofore known as a very stable chemical substance unlike a carboxylic anhydride, etc. Therefore, for initiating a transesterification reaction, it has been essential to use additionally a catalyst. Therefore, for an ordinary esterification reaction, an active carbonyl compound (such as a carboxylic anhydride or a carboxylic halide (chloride, bromide, etc.)) having corrosiveness has been used for promoting an esterification reaction. Since a carbene produced from an ionic liquid, which is a solvent, is utilized also as a catalyst in the present invention, derivatization by a transesterification reaction is possible without adding a catalyst separately. Examples of a cyclic ester compound include one or more compounds selected from δ-valerolactone, γ-butyrolactone, ε-caprolactone, etc. Further, examples of an epoxy compound include, but not limited to, one or more compounds selected from 1,2-epoxyhexane, 1,2-epoxybutane, styrene oxide, etc.

In a case where a chain or cyclic ester compound is reacted, if necessary, 2 or more chain or cyclic ester compounds may be used to introduce different substituents in a molecule of a polysaccharide. For example, by reacting at the same time a butyrate ester such as vinyl butyrate and an acetate ester such as isopropenyl acetate (IPA) with cellulose, cellulose acetate butyrate may be produced, in which each OH group of a cellulose molecule is substituted with an acetyl group or a butyryl group. Generally, in a case where a substituent, such as a butyryl group, having a longer carbon chain than an acetyl group is introduced, the glass transition temperature of a product decreases, and therefore characteristics such as moldability of a product may be regulated by changing the blend ratio of 2 or more ester compounds.

Although the amount of these chain or cyclic ester compounds or epoxy compounds depends on the type of a polysaccharide, etc., for example, 6 to 20 equivalents of the same is preferably reacted with respect to 1 equivalent of hydroxy group in a polysaccharide. There is no particular restriction on reaction conditions, as long as a carbene is produced from an ionic liquid and a reaction is progressed using the same as a catalyst. For example, in a case where a cellulose ester is produced by using a biomass source material containing cellulose as lignocellulose, and reacting a chain ester compound with the source material, a reaction may be carried out by stirring a mixture of a biomass source material, an ionic liquid, and a chain ester compound at 40° C. to 80° C. for 24 hours to 48 hours in an atmosphere of nitrogen, argon, or the like. The solution after the reaction may be subjected to reprecipitation, filtration, etc. using a solvent such as methanol to yield a predetermined polysaccharide derivative. With the above biomass source material, a cellulose derivative may be obtained by reprecipitation, and further from a filtrate a lignin derivative may be obtained. An ionic liquid used for the reaction may be recovered and reused.

A produced polysaccharide derivative may be converted to another polysaccharide derivative for the purpose of modification, etc. by a conventional method using a base such as NaOH, or an acid catalyst such as sulfuric acid, or continuously in the presence of an ionic liquid according to the present invention, by means of a further reaction with various reagents, such as a chain or cyclic ester compound. For example, by making an ester compound act on an esterified cellulose derivative, another cellulose derivative may be produced by way of a transesterification reaction.

Next, a method for producing a lignin derivative according to the present invention will be described. The method for producing is characterized in that a reaction is carried out in a mixture containing a source material containing lignin, an ionic liquid for which the pKa of a conjugate acid of an anion in DMSO is 12 to 19 and which is capable of producing a carbene, and a chain or cyclic ester compound or an epoxy compound. By performing a reaction identically with the above method for producing a polysaccharide derivative, except a source material containing lignin is used instead of a source material containing a polysaccharide, a lignin derivative corresponding to a chain or cyclic ester compound or an epoxy compound to be applied may be obtained. Namely, with a chain ester compound a transesterification reaction progresses to yield a derivative, in which a hydroxy group of lignin is esterified. The esterified product of lignin may be utilized favorably as a flame retardant, etc. Further, a polyester may be yielded by reacting a cyclic ester compound with a lignin. Further, an ether compound may be yielded by reacting an epoxy compound with a lignin. In this regard, there are a hydroxy group bonded to an aromatic carbon and a hydroxy group bonded to an aliphatic carbon in a lignin molecule, and both the hydroxy groups may be substituted according to the present invention. As a specific example, the formula of a reaction between lignin (in the formula denoted as "lignin-OH") and isopropenyl acetate in an ionic liquid of 1-ethyl-3-methylimidazolium acetate (EmimAc) is shown below. Identically with the above method for producing a polysaccharide derivative, a heterocyclic carbene produced from the ionic liquid functions as a catalyst, and acetic acid lignin is produced by a transesterification reaction.

[Formula 4]

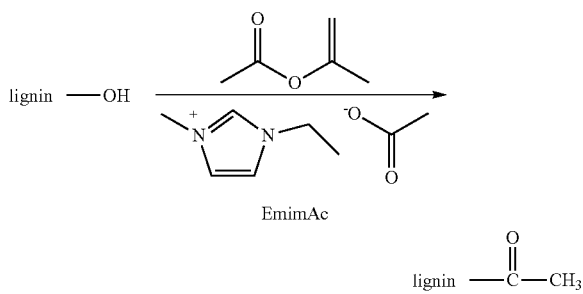

A lignin used as a source material may be selected appropriately from conventionally-known various natural lignins and isolated lignins. Examples thereof include a natural lignin, such as a softwood lignin, a hardwood lignin, and a gramineous plant lignin, lignosulfonic acid obtained in a large amount from a pulping waste liquor of a chemical paper pulp production process, a kraft lignin, an alkali lignin such as a soda lignin, a soda-anthraquinone lignin, an organosolv lignin, and an isolated lignin (industrial lignin) such as an exploded lignin. Such lignins may be used singly, or in combinations of two or more.

In the case of a method for producing a lignin derivative according to the present invention, the type of an applicable ionic liquid, the type of a chain or cyclic ester compound or an epoxy compound, and reaction conditions are the same as in the above case of the method for producing a polysaccharide derivative.

A produced lignin derivative may be converted to another lignin derivative for the purpose of modification, etc. by a conventional method using a base such as NaOH, or an acid catalyst such as sulfuric acid, or continuously in the presence of an ionic liquid according to the present invention, by means of a further reaction with various reagents, such as a chain or cyclic ester compound. For example, by making an ester compound act on an esterified lignin derivative, another lignin derivative may be produced by way of a transesterification reaction. By a reaction with an appropriate ester compound, the characteristics, such as processability, or spinnability of a lignin derivative may be improved.

EXAMPLES

The present invention will be described below specifically by way of Examples, provided that the technical scope of the present invention be not limited thereto.

Example 1

Bagasse (sugarcane residue, particle size: 250 μm to 500 μm; 120 mg) was dissolved in 1-ethyl-3-methylimidazolium acetate (pKa of the conjugate acid of the anion in DMSO: 12.3; 4 g) and dried overnight with stirring in vacuum at 80° C. Thereafter, a reactor was purged with Ar, and isopropenyl acetate (4 mL) was added to a reaction system. The obtained reaction solution was made to react overnight at 80° C. with stirring. From the reaction solution a solid polysaccharide derivative was obtained by reprecipitation with methanol and subsequent filtration. Further, a lignin derivative was obtained by distilling off in vacuum methanol and isopropenyl acetate in the obtained filtrate, and adding the obtained solution to a large amount of water to cause precipitation. From the remaining liquid phase, water was removed by distilling off in vacuum to recover the ionic liquid. With respect to the solid polysaccharide derivative, a solid $^{13}$C NMR spectrum is shown in FIG. 1C), and a FT-IR spectrum (ATR method) is shown in FIG. 2C). Further, with respect to the lignin derivative, a $^1$H NMR spectrum is shown in FIG. 3A), and a FT-IR spectrum (ATR method) is shown in FIG. 4A) respectively. In this regard, FIG. 1A), and FIG. 2A) are related to a commercially available cellulose acetate. From these results, it was confirmed that cellulose acetate, which is a cellulose derivative, was produced directly from bagasse. Further, in FIG. 1C) a peak attributable to lignin supposed to appear near 120 ppm was not observed, which indicated clearly that cellulose acetate was obtained in a condition completely separated from lignin. Further, in FIG. 3A) a peak attributable to a polysaccharide at 4.5 to 5.5 ppm was not observed, which indicated clearly that the lignin derivative was obtained in a condition separated from cellulose acetate.

Examples 2 to 4

Figure 2:
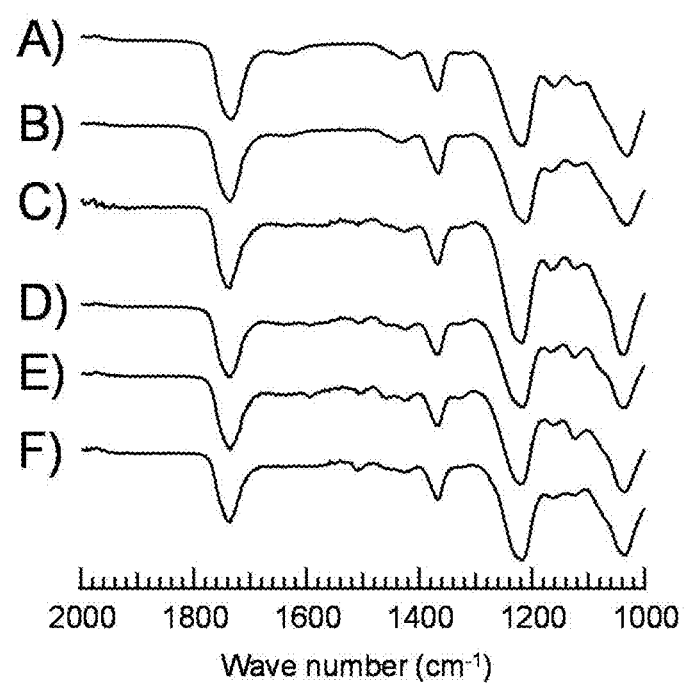
FIG. 2 is a figure showing FT-IR spectra (ATR method) of (A) a commercially available cellulose acetate, (B) a cellulose acetate synthesized in Example 5, (C) a polysaccharide derivative obtained from bagasse according to Example 1, (D) a polysaccharide derivative obtained from kenaf according to Example 2, (E) a polysaccharide derivative obtained from eucalyptus according to Example 3, and (F) a polysaccharide derivative obtained from Japanese cedar according to Example 4.
Figure 3:
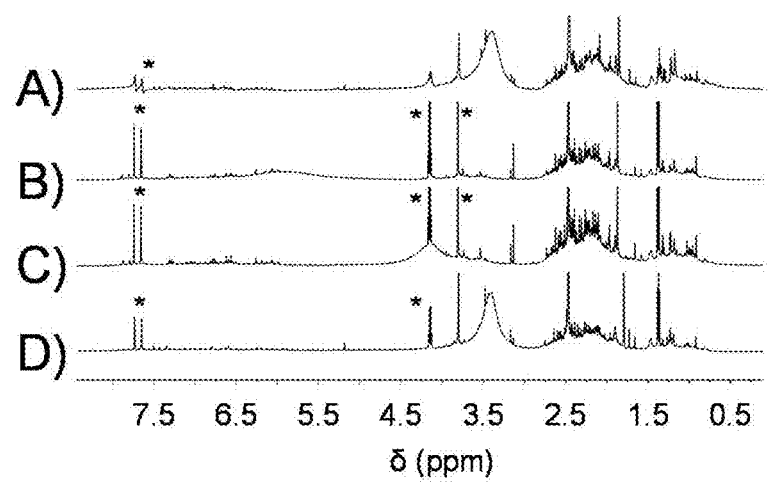
FIG. 3 is a figure showing $^1$H NMR spectra in DMSO-$d_6$ of (A) a lignin derivative obtained from bagasse according to Example 1, (B) a lignin derivative obtained from kenaf according to Example 2, (C) a lignin derivative obtained from eucalyptus according to Example 3, and (D) a lignin derivative obtained from Japanese cedar according to Example 4 (* is a peak attributable to a residual solvent).
Figure 4:
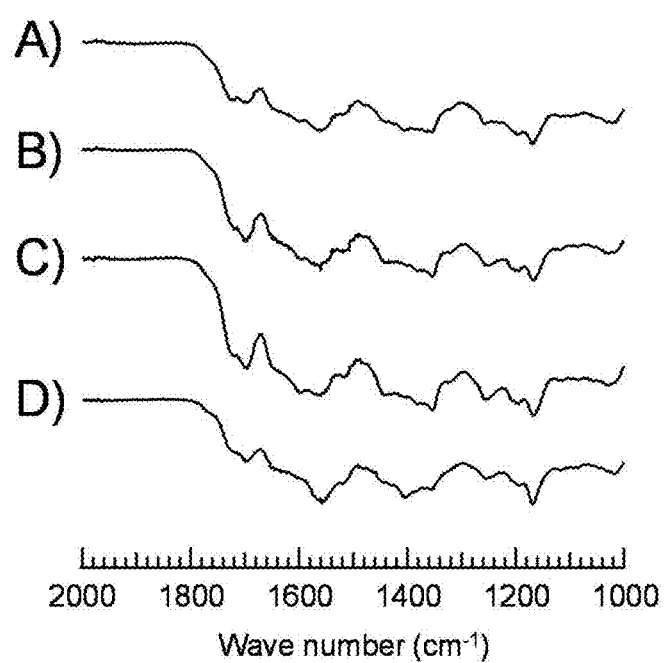
FIG. 4 is a figure showing FT-IR spectra (ATR method) of (A) a lignin derivative obtained from bagasse according to Example 1, (B) a lignin derivative obtained from kenaf according to Example 2, (C) a lignin derivative obtained from eucalyptus according to Example 3, and (D) a lignin derivative obtained from Japanese cedar according to Example 4.

A polysaccharide derivative was produced by the same procedures as in Example 1, except that kenaf (Example 2), eucalyptus (Example 3), or Japanese cedar (Example 4) was used as a biomass source material instead of bagasse. The spectra of the obtained polysaccharide derivatives and lignin derivatives are shown in FIGS. 1 to 4. FIG. 1 shows solid $^{13}$C NMR spectra, D) for the polysaccharide derivative obtained from kenaf, E) for the polysaccharide derivative obtained from eucalyptus, and F) for the polysaccharide derivative obtained from Japanese cedar. FIG. 2 shows FT-IR spectra (ATR method), D) for the polysaccharide derivative obtained from kenaf, E) for the polysaccharide derivative obtained from eucalyptus, and F) for the polysaccharide derivative obtained from Japanese cedar. Further, FIG. 3 shows $^1$H NMR spectra, B) for the lignin derivative obtained from kenaf, C) for the lignin derivative obtained from eucalyptus, and D) for the lignin derivative obtained from Japanese cedar. FIG. 4 shows FT-IR spectra (ATR method), B) for the lignin derivative obtained from kenaf, C) for the lignin derivative obtained from eucalyptus, and D) for the lignin derivative obtained from Japanese cedar. From these results, it was confirmed that cellulose acetate and a lignin derivative were obtained directly from kenaf, eucalyptus, or Japanese cedar as a source material.

Example 5

Figure 5:
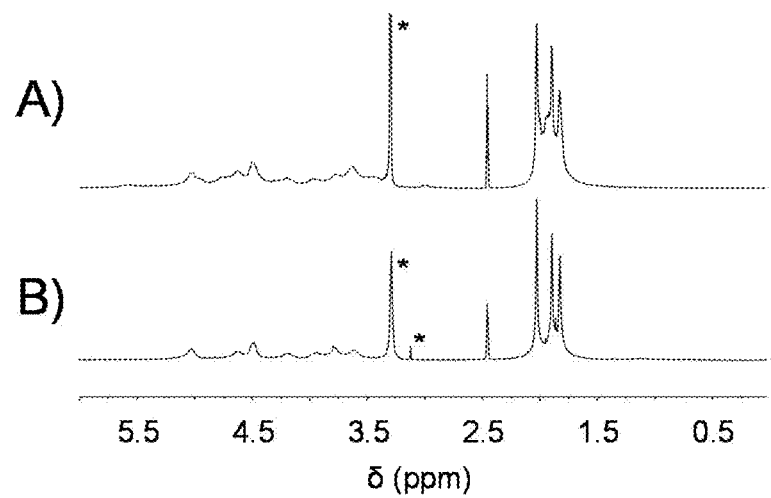
FIG. 5 is a figure showing $^1$H NMR spectra in DMSO-$d_6$ of (A) a commercially available cellulose acetate, and (B) a cellulose acetate synthesized in Example 5 (* is a peak attributable to a residual solvent).

Cellulose (Avicel, purchased from Sigma-Aldrich, Inc., 600 mg, [monomer unit]$_0$=3.7 mmol) was dissolved in 1-ethyl-3-methylimidazolium acetate (20 g), and the solution was dried in vacuum at 80° C. with stirring overnight. In this regard, [monomer unit]$_0$ means a concentration as a monomer unit (repeating unit). Thereafter, a reactor was purged with Ar, and isopropenyl acetate (20 mL, 184 mmol) was added to a reaction system. The obtained reaction solution was made to react overnight at 80° C. with stirring. The reaction solution was added to a large excess of methanol to cause reprecipitation and subsequent filtration was performed to obtain a solid substance. The solid $^{13}$C spectrum, FT-IR spectrum (ATR method), and $^1$H NMR spectrum of the obtained substance are shown in FIG. 1B), FIG. 2B), and FIG. 5B) respectively. FIG. 5A) shows a commercially available cellulose acetate. From these results, it was confirmed that cellulose acetate was obtained from cellulose as a source material.

Example 6

Figure 6:
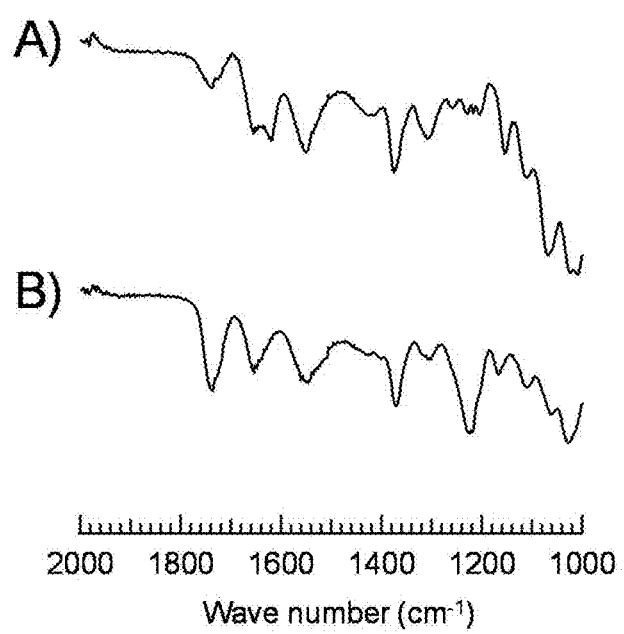
FIG. 6 is a figure showing FT-IR spectra (ATR method) of (A) a commercially available chitin, and (B) a chitin derivative synthesized in Example 6.

Chitin (purchased from Sigma-Aldrich, Inc., 120 mg, [monomer unit]$_0$=0.54 mmol) was dissolved in 1-ethyl-3-methylimidazolium acetate (4 g), and the solution was dried in vacuum at 80° C. with stirring overnight. Thereafter, a reactor was purged with Ar, and isopropenyl acetate (4 mL, 37 mmol) was added to a reaction system. The obtained reaction solution was made to react overnight at 80° C. with stirring. The reaction solution was added to a large excess of methanol to cause reprecipitation and subsequent filtration was performed to obtain a solid substance. The FT-IR spectrum (ATR method) of the obtained substance is shown in FIG. 6B). FIG. 6A) is directed to chitin used as a source material. From these results, progress of a transesterification reaction of chitin using chitin as a source material was confirmed.

Example 7

Cellulose (60 mg, [monomer unit]$_0$=0.40 mmol) was dissolved in 1-ethyl-3-methylimidazolium acetate (2.0 g), and the solution was dried in vacuum at 80° C. with stirring overnight. Thereafter, a reactor was purged with Ar, and 1,2-epoxyhexane (2 mL, 16.6 mmol) was added to the reaction solution, and a reaction was performed in an argon atmosphere. After the completion of the reaction, the reaction solution was added to methanol to cause precipitation, and filtration was performed to recover a solid substance.

Figure 7:
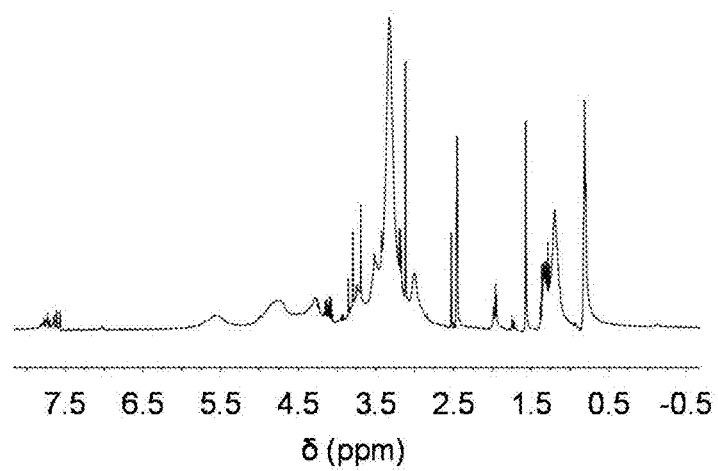
FIG. 7 is a figure showing a $^1$H NMR spectrum in DMSO-$d_6$ of a cellulose ether synthesized in Example 7.

The obtained solid substance was dried in vacuum to obtain a product. FIG. 7 shows a $^1$H NMR spectrum of the product. From this result, the product was identified as cellulose ether.

Example 8

Figure 8:
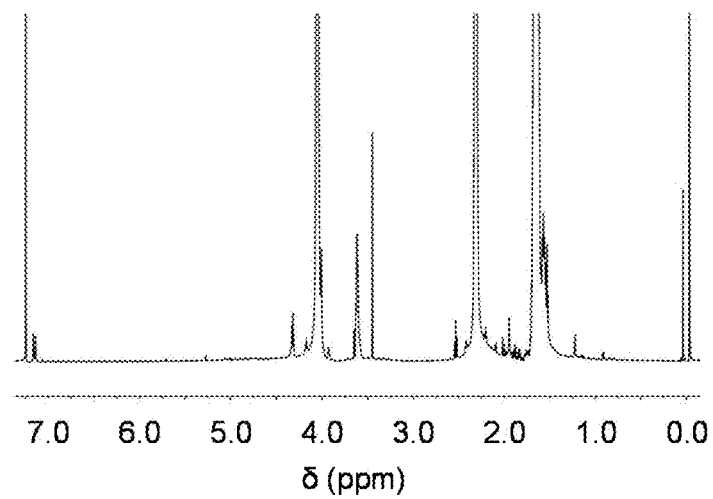
FIG. 8 is a figure showing a $^1$H NMR spectrum in CDCl$_3$ of a polyester synthesized in Example 8.
Figure 9:
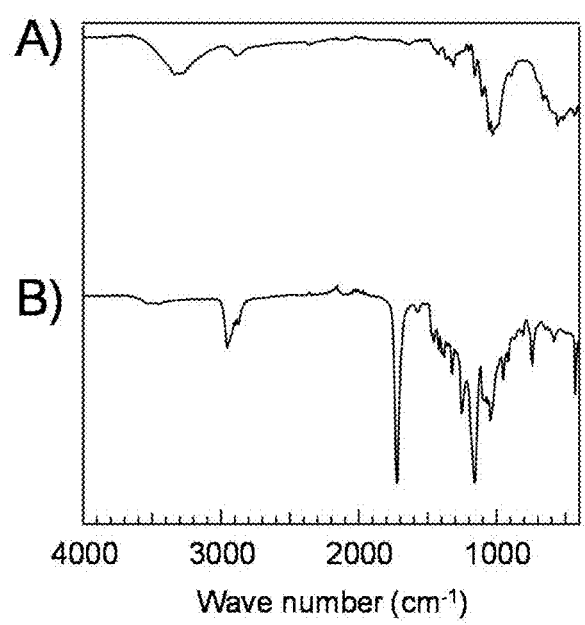
FIG. 9 is a figure showing FT-IR spectra (ATR method) of (A) a cellulose, and (B) a polyester synthesized in Example 8.

Cellulose (60 mg, [monomer unit]$_0$=0.40 mmol) was dissolved in 1-ethyl-3-methylimidazolium acetate (4.0 g), and the solution was dried in vacuum at 80° C. with stirring overnight. Thereafter, a reactor was purged with Ar, and δ-valerolactone (4 mL, 44 mmol) was added. The obtained reaction solution was made to react overnight at 80° C. with stirring. The obtained liquid was added to methanol to cause precipitation, and the precipitate was recovered by decantation. A $^1$H NMR spectrum and a FT-IR spectrum (ATR method) measured on the recovered precipitate are shown in FIG. 8 and FIG. 9 B) respectively. Meanwhile, FIG. 9A) shows a FT-IR spectrum of cellulose. From the results of FIG. 8 and FIG. 9 it was confirmed that polyester was produced.

Comparative Example 1

Figure 10:
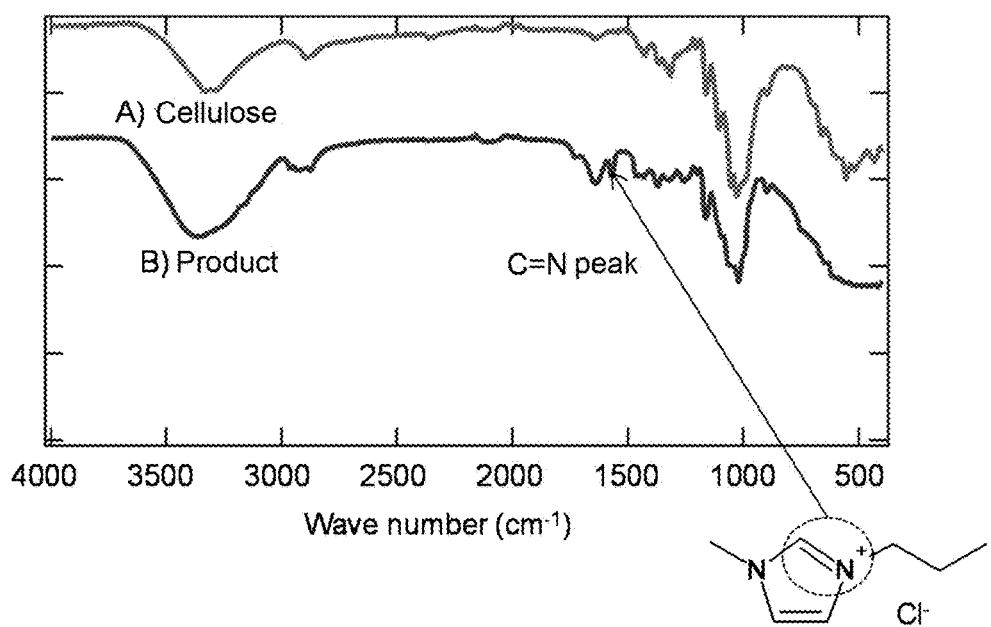
FIG. 10 is a figure showing FT-IR spectra (ATR method) of (A) cellulose before a reaction, and (B) a product in Comparative Example 1.

Cellulose (Avicel, purchased from Sigma-Aldrich, Inc., 60 mg, [monomer unit]$_0$=0.37 mmol) was added in 1-ethyl-3-methylimidazolium chloride (pKa of the conjugate acid of the anion in DMSO: 1.8, 2 g), and the mixture was dried in vacuum at 80° C. with stirring overnight. Thereafter, a reactor was purged with Ar, and isopropenyl acetate (2 mL, 18.4 mmol) was added to a reaction system, which was made to react overnight at 80° C. with stirring. The FT-IR spectrum (ATR method) of a product is shown in FIG. 10B). Meanwhile, FIG. 10A) is directed to cellulose before the reaction. As shown in FIG. 10, with respect to the product there appears no peak at 1750 cm$^{-1}$, and it has become clear that a hydroxy group of cellulose is not substituted with an acetyl group.

(Example 9) Synthesis of Cellulose Acetate Butyrate

Figure 11:
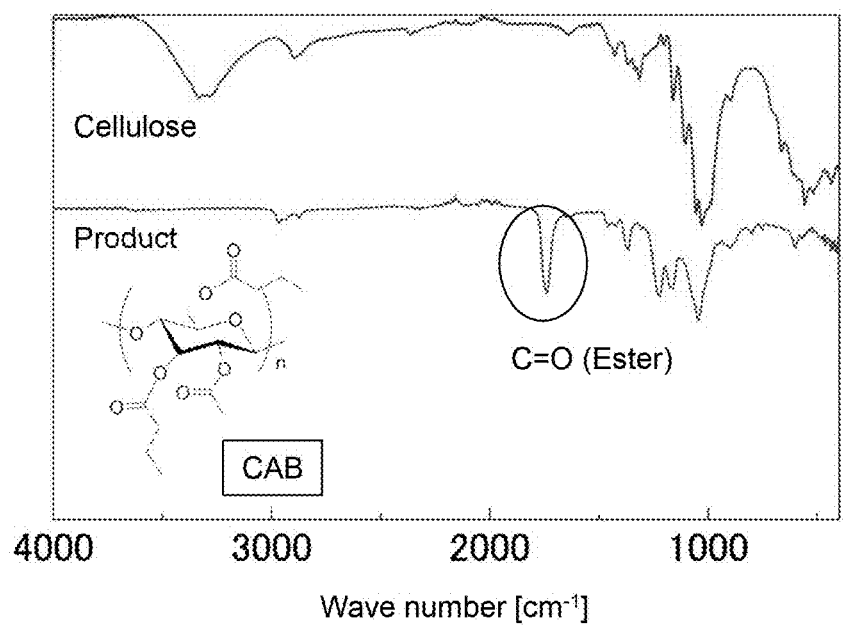
FIG. 11 is a figure showing IR spectra of a cellulose as a source material, and a cellulose acetate butyrate synthesized in Example 9.
Figure 12:
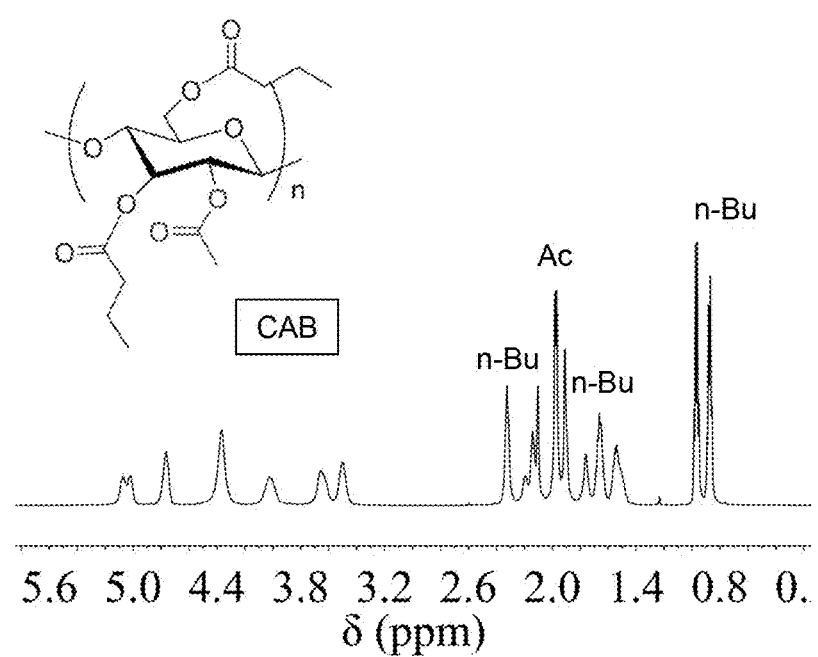
FIG. 12 is a figure showing a $^1$H NMR spectrum in CDCl$_3$ of a cellulose acetate butyrate synthesized in Example 9.

Cellulose acetate butyrate (CAB) was synthesized by a transesterification reaction of cellulose. The synthesis method is described below. Firstly, cellulose (240 mg, glucose unit=1.48 mmol) and 8 g of 1-ethyl-3-methylimidazolium acetate (EmimAc) were weighed out and placed in a Schlenk tube. The mixed solution obtained was dried in vacuum at 80° C. in an oil bath for 3 hours, and the system was purged with argon. Next, 0.2 to 0.5 mL of vinyl butyrate or isopropenyl acetate (IPA) was dropped into the reaction solution to initiate a reaction. After a reaction at 80° C. overnight, 8 mL of IPA (73.5 mmol) or vinyl butyrate (63.1 mmol) was dropped into the reaction solution to continue the reaction at 80° C. for another 4 hours. In this step a large excess of reagent was added in order to esterify an unreacted hydroxy group by a transesterification reaction. After the completion of the reaction, the obtained solution was purified by reprecipitation in a mixed solution of methanol and water. A solid collected by filtration was dried in vacuum to obtain cellulose acetate butyrate as the reaction product. The cellulose acetate butyrate was subjected to a benzoylation reaction for the purpose of measurement of the degree of substitution of the cellulose acetate butyrate. The procedures for benzoylation were as follows. Firstly, cellulose acetate butyrate (100 mg), chloroform (4 mL), and triethylamine (0.44 mL, 3.12 mmol) were weighed out and placed into an eggplant-shaped flask. Benzoic acid chloride (0.36 mL, 3.12 mmol) was dropped into the obtained solution, and the reaction solution was stirred. After performing an overnight reaction, the reaction solution was subjected to reprecipitation in a mixed solution of methanol and water. Thereafter, the obtained solid was dried in vacuum to obtain an aimed polymer. The chemical structure of the obtained product was determined by an IR spectroscopic analysis and a $^1$H NMR analysis. With respect to the product an IR spectrum is shown in FIG. 11, and a $^1$H NMR spectrum (in CDCl$_3$) is shown in FIG. 12 respectively. The upper part of FIG. 11 shows an IR spectrum of cellulose, which is a source material. The position selectivity of an acetyl group and a butyryl group in the product was not necessarily as represented in the chemical formula in FIG. 11 and FIG. 12. As the result of the $^1$H NMR analysis, the substitution position of an acetyl group and a butyryl group with respect to 3 hydroxy groups in cellulose is random, and any difference in introduction rates of an acetyl group and a butyryl group among the positions of hydroxy group in cellulose was not recognized. As shown in FIG. 11 and FIG. 12, it was confirmed that cellulose acetate butyrate was produced.

Figure 13:
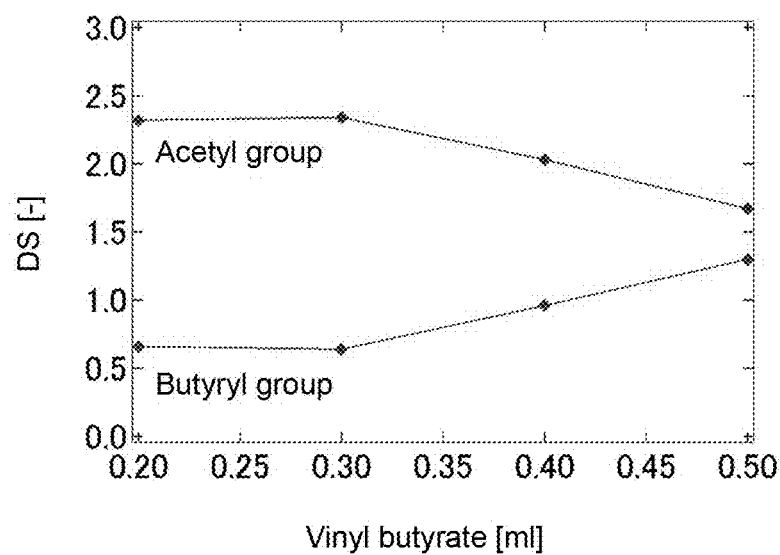
FIG. 13 is a graph showing a change of degree of substitution of an acetyl group and a butyryl group of the product with respect to the amount of vinyl butyrate used in Example 9.
Figure 14:
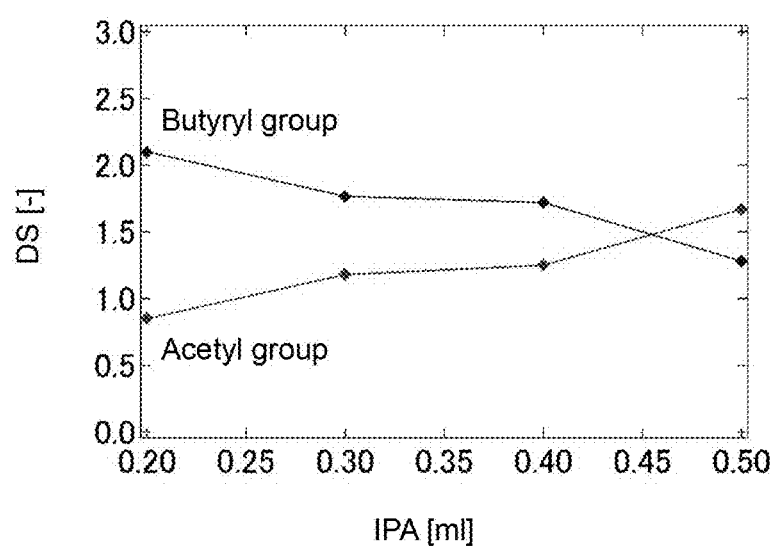
FIG. 14 is a graph showing a change of degree of substitution with an acetyl group and a butyryl group of the product with respect to the amount of isopropenyl acetate (IPA) used in Example 9.
Figure 15:
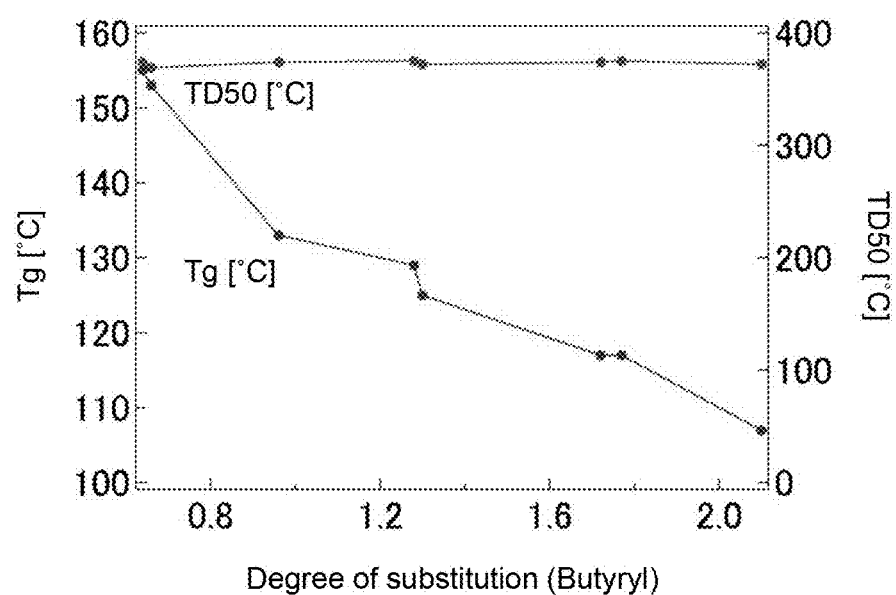
FIG. 15 is a graph showing a change of a glass transition temperature (Tg) and a thermal decomposition temperature ($T_{D50}$) of the product with respect to the degree of substitution with a butyryl group in Example 9.

A change in the degrees of substitution of acetyl group and butyryl group in the product with the amount (0.2 to 0.5 mL) of vinyl butyrate, or isopropenyl acetate (IPA) used is shown in FIG. 13 and FIG. 14 respectively. In this regard, the degrees of substitution of acetyl group and butyryl group can be calculated from an $^1$H NMR spectrum. Further, changes in the glass transition temperature (Tg), and the thermal decomposition temperature ($T_{D50}$) of cellulose acetate butyrate with the degree of substitution (butyryl group) is shown in FIG. 15. From the results of FIG. 13 and FIG. 14, it was found that the introduction ratio of an acetyl group to a butyryl group may be regulated by adjusting the amount of reagents. Further, as shown in FIG. 15 it became clear that with increase in the degree of substitution with a butyryl group the thermal decomposition temperature does not change, and the glass transition temperature decreases. From the above, it was suggested that the physical properties such as moldability of cellulose acetate butyrate may be regulated by adjusting the amount of reagents to be used.

(Example 10) Synthesis of Cellulose Acetate Using DMSO as Cosolvent

Cellulose (120 mg, glucose unit=0.74 mmol), 1-ethyl-3-methylimidazolium acetate (EmimAc, 440 mg) were encapsulated in a Schlenk tube. The mixed solution was dried in vacuum at 80° C. with stirring for 4 hours. After completion of drying, the system was purged with argon. Next, dimethyl sulfoxide (DMSO, 4 mL), and isopropenyl acetate (IPA, 4 mL) were dropped into the reaction system to cause a reaction to continue at 80° C. overnight. After the completion of the reaction, the reaction solution was subjected to reprecipitation in methanol to yield a solid product. A benzoylation reaction of cellulose acetate was carried out for the purpose of measurement of the degree of substitution of the obtained cellulose acetate. The procedures for benzoylation were as follows. Firstly, cellulose acetate (100 mg), chloroform (4 mL), and triethylamine (0.44 mL, 3.12 mmol) were weighed out and placed into an eggplant-shaped flask. Benzoic acid chloride (0.36 mL, 3.12 mmol) was dropped into the obtained solution, and the reaction solution was stirred. After performing an overnight reaction, the reaction solution was subjected to reprecipitation in methanol. Thereafter, the obtained solid was dried in vacuum to obtain an aimed polymer. The chemical structure of the obtained product was determined by a ¹H NMR analysis.

Figure 16:
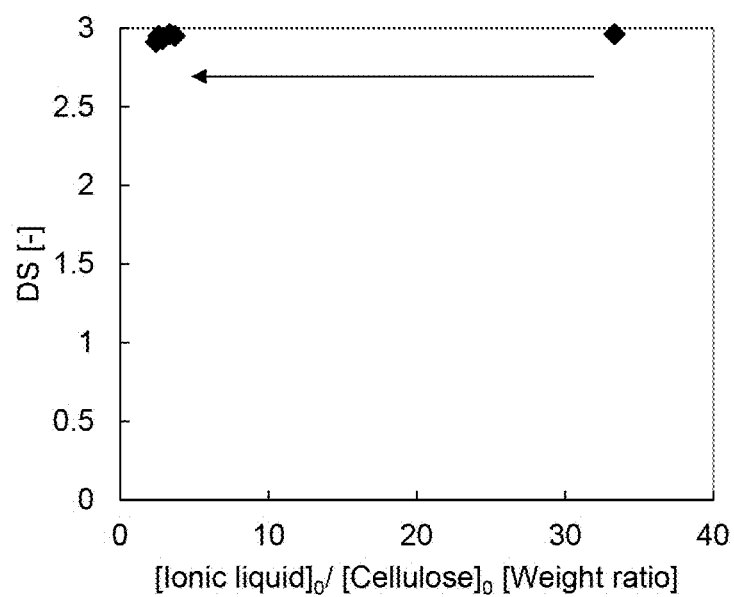
FIG. 16 is a graph showing a change of degree of substitution with respect to a weight ratio of an ionic liquid to cellulose in Example 10.

The above experiment was repeated but changing variously the weight of the ionic liquid (EmimAc) with respect to 120 mg of cellulose. A change in the degree of substitution of hydroxy groups in cellulose with the weight ratio of ionic liquid to cellulose ([ionic liquid]$_0$/[cellulose]$_0$) is shown in FIG. 16. Although the experiment was conducted by changing the weight ratio from 1.25 to 33.33, as obvious from FIG. 16 a cellulose acetate with a high degree of substitution was obtained at any weight ratio. In a case where the weight ratio was 2.42 or more, the degree of substitution exceeds 2.9, however in a case where the weight ratio was 1.25, the degree of substitution became 2.78, and the production amount of cellulose acetate decreased slightly. Namely, it was suggested that the weight ratio was preferably 2 or more.

(Example 11) Synthesis of Acetic Acid Lignin

Figure 17:
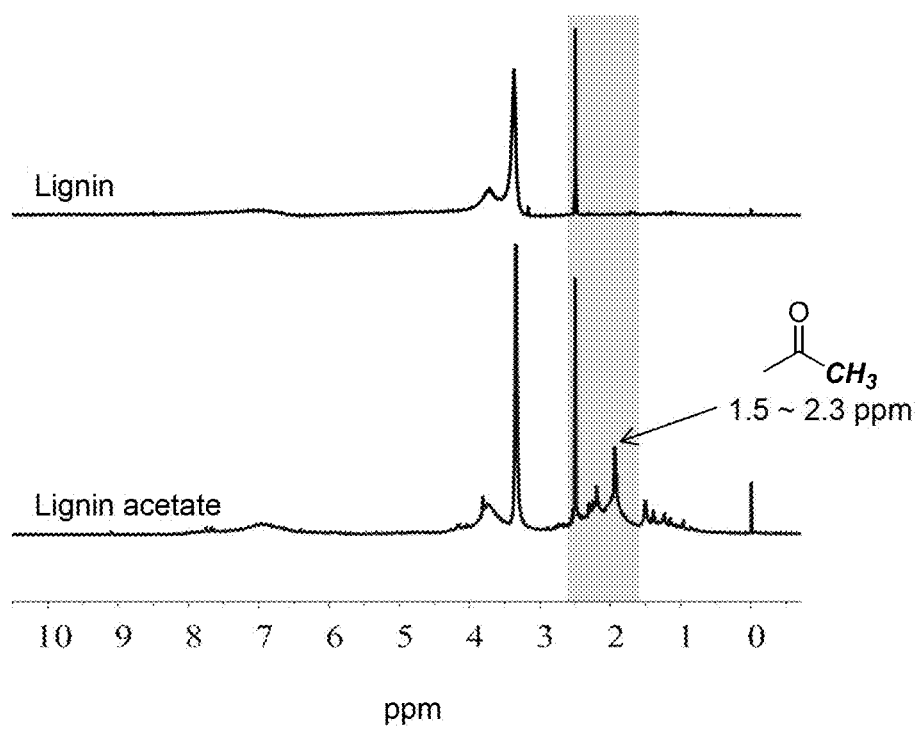
FIG. 17 is a figure showing $^1$H NMR spectra of an acetic acid lignin synthesized in Example 11 and a source material lignin.
Figure 18:
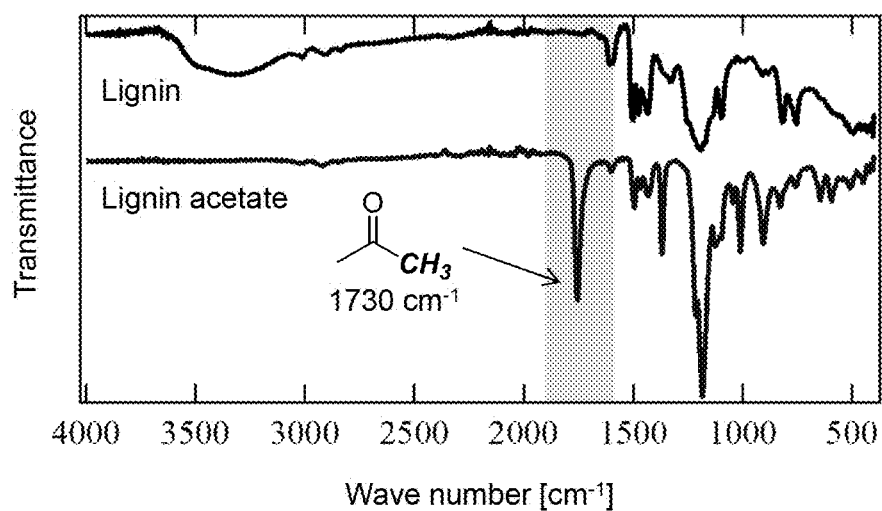
FIG. 18 is a figure showing FT-IR spectra of an acetic acid lignin synthesized in Example 11 and a source material lignin.

Alkali lignin (1 g) and 1-ethyl-3-methylimidazolium acetate (EmimAc, 20 g) were encapsulated in a Schlenk tube, and the mixture was dried overnight in vacuum at 80° C. with stirring in an oil bath. In an argon atmosphere, isopropenyl acetate (IPA, 20 mL, 0.183 mol) was added, and the obtained reaction solution was stirred at 80° C. for 2 hours. The solution after the reaction was subjected to reprecipitation in water, and the obtained solid was dried in vacuum to yield a product. The structure of the product acetylated lignin was examined by ¹H NMR and FT-IR analyses. A ¹H NMR spectrum of the product is shown in FIG. 17, and a FT-IR spectrum of the same is shown in FIG. 18 respectively. According to the results of FIG. 17 and FIG. 18, a peak of an acetyl group was observed to confirm the production of acetic acid lignin.

(Reference Example 1) Transesterification Reaction on Acetic Acid Lignin

Figure 19:
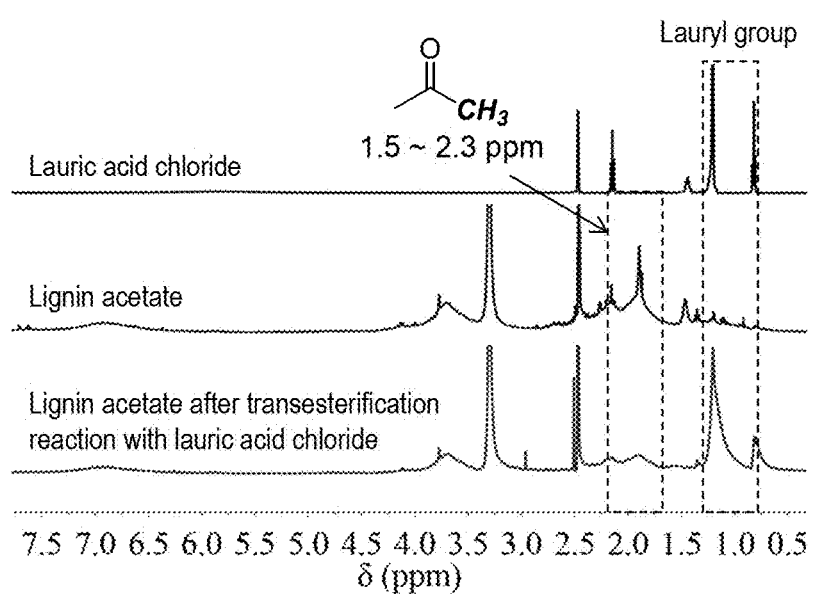
FIG. 19 is a figure showing $^1$H NMR spectra of the product in Reference Example 1, and the reactants of lauric acid chloride and acetic acid lignin.

Acetylated lignin (50 mg), DMF (2 mL), sodium hydroxide (NaOH, 70.5 mg, 1.76 mmol), lauric acid chloride (1 mL, 4.32 mmol) were encapsulated in an eggplant-shaped flask, and a reaction was performed in a nitrogen atmosphere at 80° C. in an oil bath with stirring overnight (21 hours). The solution after the reaction was concentrated, to which hexane was added. The obtained solution was subjected to a centrifugal operation to obtain a solid. The obtained solid was further washed with water. A recovered solid was dried in vacuum to obtain an aimed product. The structure of the product was examined by ¹H NMR and FT-IR analyses. A ¹H NMR spectrum of the product is shown in FIG. 19 together with ¹H NMR spectra of acetic acid lignin, which is a reaction product, and lauric acid chloride. As obvious from the result of FIG. 19, it was found that an acetyl group of acetic acid lignin is substituted with a lauroyl group due to occurrence of a transesterification reaction of acetic acid lignin.

In this regard, the present invention is not limited to the aforedescribed Embodiments, and various modifications are included in the scope. For example, with respect to part of constituents of an Embodiment, addition of another constituent, deletion, and replacement are possible.

All the publication, patent, and patent application cited herein are also herein incorporated as-are by reference.

The invention claimed is:

1. A method for producing a cellulose derivative, wherein a reaction is carried out without using a catalyst in a mixture comprising: a biomass source material comprising cellulose as lignocellulose; an ionic liquid in which a cation is represented by the following Formula (1):

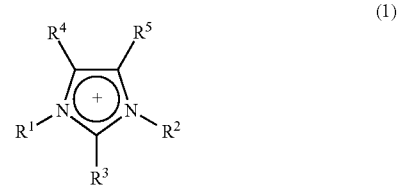

wherein, $R^1$ and $R^2$ each independently is an alkyl group, an alkenyl group, an alkoxyalkyl group, or a substituted or unsubstituted phenyl group, and $R^3$ to $R^5$ each independently is hydrogen, an alkenyl group, an alkoxyalkyl group, or a substituted or unsubstituted phenyl group, for which the pKa of a conjugate acid of an anion in DMSO is 12 to 19 and which is capable of producing a carbene; and a chain or cyclic ester compound, and wherein the chain or cyclic ester compound is a cyclic ester compound.

2. The method for producing a cellulose derivative according to claim 1, wherein a cellulose derivative is produced in a condition separated from a lignin.

3. The method for producing a cellulose derivative according to claim 2, wherein the cellulose derivative is produced, and also a lignin derivative is produced.

4. The method for producing a cellulose derivative according to claim 1, wherein the ionic liquid is included in the mixture as a cosolvent system with an organic solvent.

5. The method for producing a cellulose derivative according to claim 1, wherein the weight of the ionic liquid is two times or more of the weight of the cellulose.

6. The method for producing a cellulose derivative according to claim 1, wherein 2 or more chain or cyclic ester compounds are included in the mixture.

7. The method for producing a cellulose derivative according to claim 1, wherein an anion of the ionic liquid is a carboxylate anion.

8. The method for producing a cellulose derivative according to claim 1, wherein the carbene is produced spontaneously.

9. The method for producing a cellulose derivative according to claim 1, wherein the carbene is produced spontaneously by heating the ionic liquid.

10. A method for producing a lignin derivative,
wherein a reaction is carried out without using a catalyst in a mixture comprising: a source material comprising a lignin; an ionic liquid in which a cation is represented by the following Formula (1):

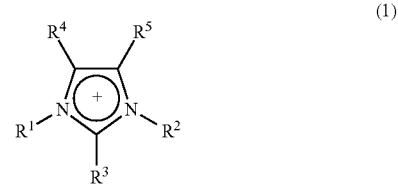

wherein, $R^1$ and $R^2$ each independently is an alkyl group, an alkenyl group, an alkoxyalkyl group, or a substituted or unsubstituted phenyl group, and $R^3$ to $R^5$ each independently is hydrogen, an alkenyl group, an alkoxyalkyl group, or a substituted or unsubstituted phenyl group, for which the pKa of a conjugate acid of an anion in DMSO is 12 to 19 and which is capable of producing a carbene; and a chain or cyclic ester compound, and wherein the chain or cyclic ester compound is a cyclic ester compound.

11. The method for producing a lignin derivative according to claim 10, wherein 2 or more chain or cyclic ester compounds are included in the mixture.

12. The method for producing a lignin derivative according to claim 10, wherein an anion of the ionic liquid is a carboxylate anion.

13. The method for producing a lignin derivative according to claim 10, wherein the carbene is produced spontaneously.

14. The method for producing a lignin derivative according to claim 10, wherein the carbene is produced spontaneously by heating the ionic liquid.

* * * * *